United States Patent [19]
Hirsch et al.

[11] Patent Number: 5,527,379
[45] Date of Patent: Jun. 18, 1996

[54] PROCESS FOR A DIRECT REDUCTION OF IRON OXIDE CONTAINING MATERIALS TO FORM FE₃C

[75] Inventors: Martin Hirsch, Friedrichsdorf; Reza Husain, Friedberg; Alpaydin Saatci, Frankfurt am Main; Wolfgang Bresser, Grossostheim, all of Germany

[73] Assignee: Metallgesellschaft Aktiengesellschaft, Frankfurt am Main, Germany

[21] Appl. No.: 261,257

[22] Filed: Jun. 17, 1994

[30] Foreign Application Priority Data

Jun. 19, 1993 [DE] Germany ............................ 43 20 359.0
Jan. 24, 1994 [DE] Germany ............................ 44 10 093.0

[51] Int. Cl.⁶ ................................................. C21B 13/14
[52] U.S. Cl. ................................. 75/436; 75/450; 423/439
[58] Field of Search ...................... 75/436, 450; 423/439

[56] References Cited

U.S. PATENT DOCUMENTS

| Re. 32,247 | 9/1986 | Stephens, Jr. . |
|---|---|---|
| 5,073,194 | 12/1991 | Stephens et al. . |
| 5,118,479 | 6/1992 | Stephens, Jr. et al. . |
| 5,137,566 | 8/1992 | Stephens, Jr. et al. . |
| 5,431,711 | 7/1995 | Meissner ................................. 75/450 |

FOREIGN PATENT DOCUMENTS

| 0196359 | 10/1986 | European Pat. Off. . |
|---|---|---|
| 0543757 | 5/1993 | European Pat. Off. . |
| 2700427 | 7/1978 | Germany . |
| 4320359 | 10/1994 | Germany . |
| 4410093 | 3/1995 | Germany . |
| WO80/02652 | 12/1980 | WIPO . |
| WO92/02647 | 2/1992 | WIPO . |
| WO92/02824 | 2/1992 | WIPO . |
| WO92/02646 | 2/1992 | WIPO . |
| WO92/02458 | 2/1992 | WIPO . |

*Primary Examiner*—Melvyn Andrews
*Attorney, Agent, or Firm*—Herbert Dubno

[57] ABSTRACT

In order to effect a reduction and a carburization to form $Fe_3C$ to the highest possible degree in a relatively short time in an economical process, a treatment in two stages is effected in fluidized beds. The first stage is effected in a circulating fluidized bed system, in which the amount of solids circulated per hour is at least five times the weight of solids contained in the fluidized bed reactor and a major part of the iron content of the charge is pre-reduced. The remaining reduction and the partial or complete conversion to $Fe_3C$ are effected in the second stage in a conventional fluidized bed. Water is condensed from the exhaust gas from the circulating fluidized bed system and that gas is strengthened by an addition of reducing gases and is reheated to the temperature which is required for the process. A part of the reheated recycle gas is supplied as a fluidizing gas to the conventional fluidized bed and the other part of the recycle gas is supplied as a fluidizing gas to the fluidized bed reactor of the circulating fluidized bed. The exhaust gas from the conventional fluidized bed is supplied as a secondary gas to the fluidized bed reactor of the circulating fluidized bed system.

14 Claims, 1 Drawing Sheet

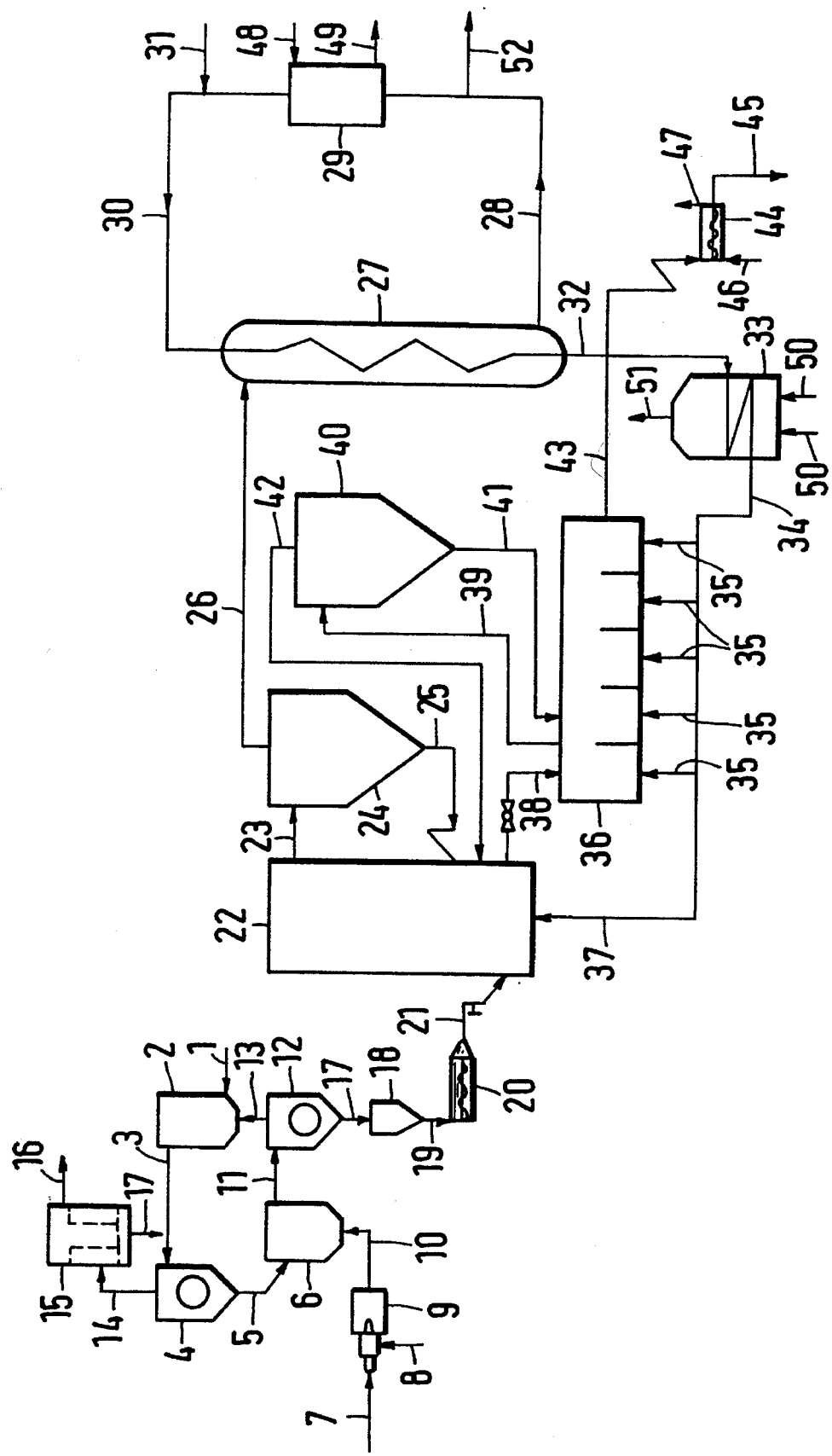

PROCESS FOR A DIRECT REDUCTION OF IRON OXIDE CONTAINING MATERIALS TO FORM FE₃C

FIELD OF THE INVENTION

Our present invention relates to a process for a direct reduction of iron oxide containing materials in fluidized beds with a circulation of reducing gas.

BACKGROUND OF THE INVENTION

Direct reduction of iron oxide containing fine-grained materials, such as iron ores, iron ore concentrates or iron ore-containing intermediate products, by means of reducing gases in a fluidized bed, yields a sponge iron product (DRI) which has pyrophoric properties and for this reason must be aftertreated.

Processes for a direct reduction of such materials to produce sponge iron and for a carburization to form $Fe_3C$ have also been proposed. The product which contains $Fe_3C$ is not pyrophoric and may be stored and transported without an aftertreatment. Besides, it contains enough carbon from the reduction of the residual iron oxide and for generation of heat as the $Fe_3C$-containing product is melted.

Published German Application 27 00 427 and U.S. Pat. No. 32,247 disclose for the production of $Fe_3C$ a process in which fine-grained iron oxide is reacted to $Fe_3C$ in a conventional fluidized bed. A hot reducing gas is introduced as a fluidizing gas into the fluidized bed. The fluidizing gas contains $H_2$, CO, $CH_4$, $CO_2$, $N_2$, and $H_2O$.

The ratio between $H_2$ and the carbonaceous components is preferably so adjusted that the hydrogen effects the reduction to metallic iron and the carbon effects the carburization to $Fe_3C$ because in that case only water is formed as a gaseous reaction product and can be removed from the exhaust gas by condensation. The ratio of $H_2$ to the resulting water is kept between 2.5:1 and 8:1 and the ratios of CO to $CO_2$ and of $H_2$ to $H_2O$ are selected to substantially maintain an equilibrium with $CH_4$. The ratio of CO to $CO_2$ lies between 1:1 and 4:1.

Analyses of the exhaust gas from the fluidized bed reveal 58.3 to 77% $H_2$, 0.5% $N_2$, 5.2 to 7.9% $CH_4$, 8.9 to 21.4% CO, 2.0 to 6.8 $CO_2$, balance water vapor, and the $Fe_3C$ product contains 4.35 to 8.96% C. The temperature in the fluidized bed is required to lie between 482° and 704° and the range from 549° and 632° C. is particularly preferred.

The exhaust gas is cooled in an indirect heat exchanger and is then cooled with water in a scrubber below the dewpoint temperature of the water vapor, whereby the water vapor content is substantially condensed and dust is scrubbed off at the same time.

The purified exhaust gas is preheated in the heat exchanger and is then heated further in a reheater and is replenished by an addition of reducing gases and then recycled as a fluidizing gas to the fluidized bed reactor.

The $Fe_3C$ product is directly charged to a furnace whose off gas is used to replenish the recycled gas. In a conventional fluidized bed, fresh material becomes very quickly mixed in the bed so that the material which is discharged always contains a part of the unreacted oxide material. Besides, the pressure drop from the wind box to the fluidized bed may vary so that the gas distribution is not uniform.

U.S. Pat. No. 5,118,479 discloses a process by which the above-described disadvantages of the normal conventional fluidized bed are allegedly avoided. In that process, a plurality of spaced apart metal plates which are at right angles and parallel to each other are arranged in the reactor that contains the conventional fluidized bed. Alternate metal plates are adjoined at one end to opposite walls of the reactor and at the other end of each of said plates defines a gap with the wall of the reactor. As a result the charged fresh material flows along a labyrinth path from the inlet to the outlet. The fluidizing gas preferably contains (in mole percent) up to 20%, preferably 50 to 10%, CO, up to 20%, preferably 2 to 8%, $CO_2$, up to 80%, preferably 35 to 50%, $CH_4$, up to 80%, preferably 35 to 50%, $H_2$, 0 to 15%, preferably 0 to 10%, $N_2$, up to 5%, preferably 1 to 2%, water vapor. The reaction is effected under a pressure of 1 to 3.1 bars, preferably 1 to 2.1 bars. The fluidizing gas is introduced at a temperature from 500° to 750° C., preferably 600° to 700° C. The temperature in the gas space over the fluidized bed is 500° to 600° C. In a conventional fluidized bed containing the above-described internal inserts the reaction conditions are poor because the velocities are low. For a high throughput rate, a reactor which is large in diameter is required so that it is even more difficult to achieve a uniform distribution of gas.

In WO 92/02646 it is proposed to preheat in an oxidizing atmosphere at least a part of the fresh material before it is charged into the conventional fluidized bed. Preheating is effected to 500° to 900° C. and serves to oxidize $Fe_3O_4$ at least in part to $Fe_2O_3$, to remove sulfide sulfur and water and to preheat the charge. The preheated material is reduced and carburized in a conventional fluidized bed, in which the material is conducted along a labyrinth path as described hereinbefore.

OBJECTS OF THE INVENTION

It is an object of the invention to effect a reduction and a carburization to form $Fe_3C$ to the highest possible degree in a relatively short time in an economical process.

An object of the invention is also to permit a reduction to the highest possible degree in a relatively short time to be economically effected in order to provide a product which has a lower carbon content than $Fe_3C$.

SUMMARY OF THE INVENTION

The object is accomplished in accordance with the invention in that a) in a first reducing stage the iron oxide containing materials are charged into the fluidized bed reactor of a circulating fluidized bed system, hot reducing gas is supplied as a fluidizing gas to the fluidized bed reactor, the iron oxides are pre-reduced, the suspension discharged from the fluidized bed reactor is treated in the recycle cyclone of the circulating fluidized bed system to remove substantially all solids and the separated solids are recycled to the fluidized bed reactor in such a manner that the amount of solids which are circulated per hour in the circulating fluidized bed system is at least five times the weight of solids contained in the fluidized bed reactor, b) solids from the first reducing stage are supplied in a second reducing stage to a conventional fluidized bed, hot educing gas is supplied as a fluidizing gas to the conventional fluidized bed, the solids are reacted to remove the remaining oxygen content and to convert the iron content substantially completely to $Fe_3C$, the exhaust gas from the conventional fluidized bed is supplied as a secondary gas to the fluidized bed reactor employed in accordance with step (a) and the product which contains $Fe_3C$ is withdrawn from the conventional fluidized bed, c) the exhaust gas from the recycle cyclone used in accordance with step (a) is cooled below its dewpoint temperature and water is condensed from the exhaust gas, d) a partial stream of the exhaust gas is drawn off, e) the remaining partial stream is replenished by an addition of reducing gas and is reheated and is then used as a recycle gas, a part of which is supplied as a fluidizing gas to the fluidized bed reactor of the first reducing stage employed in accordance with step (a) and another part of which is supplied to the fluidized bed of the second reducing stage employed in accordance with step (b).

The circulating fluidized bed system consists of a fluidized bed reactor, a separator for separating solids from the suspension discharged from the fluidized bed reactor—that separator generally consists of a recycle cyclone—and a recycle line for recycling the separated solids to the fluidized bed reactor. From the conventional fluidized bed, in which a dense phase is separated by a distinct density step from the overlying gas space, that fluidized bed concept differs by states of distribution without a defined boundary layer. There is no density step between a dense phase and the overlying dust space but the solids concentration in the reactor decreases continuously from bottom to top. A gas-solids suspension is discharged from the top part of the reactor. In the definition of the operating conditions by the Froude and Archimedes numbers the following ranges are obtained:

$$0.1 \leq 3/4\, Fr^2 \times \frac{\rho_g}{\rho_k - \rho_g} \leq 10$$

and $0.01 \leq Ar \leq 100$
wherein $$Ar = \frac{d_k^3 \cdot g(\rho_k - \rho_g)}{\rho_g \cdot v^2}$$

and $$Fr^2 = \frac{u^2}{g \cdot d_k}$$

$\mu$=relative gas velocity in m/sec.
Ar=Archimedes number
Fr=Froude number
$\rho_g$=density of gas in kg/m$^3$
$\rho_k$=density of solid particle in kg/m$^3$
$d_k$=diameter of spherical particle in m
v=kinematic viscosity in m$^2$/sec.
g=constant of gravitation in m/sec$^2$.

The prereduction in the circulating fluidized bed system is effected to a reduction ratio of about 60 to 90%. The optimum value regarding the utilization of the reducing gas is adjusted in that range in dependence on the reduction behavior of the ore which is concerned in order to achieve the optimum throughput rate. The temperature in the reactor of the circulating fluidized bed system is adjusted to about 550° to 650° C.

That part of the solids which is supplied from the first reducing stage to the second reducing stage may be taken from the recycle line of the circulating fluidized bed system or from the fluidized bed reactor of the circulating fluidized bed system.

The fluidized bed reactor is charged with the solids on that side which is opposite to the side on which the Fe$_3$C product is withdrawn. The iron content of the solids which have been charged into the conventional fluidized bed is converted to Fe$_3$C to the highest possible degree and generally with a conversion of 70 to 95%.

The temperature in the conventional fluidized bed is adjusted to about 550° to 650° C.

The exhaust gas from the conventional fluidized bed is introduced as a secondary gas into the fluidized bed reactor of the circulating fluidized system in a height which is up to 30% of the height of the reactor above the bottom.

The exhaust gas from the recycle cyclone of the circulating fluidized bed system is sufficiently cooled to decreate the water vapor content in the gas below about 1.5%.

Cooling is generally effected in a scrubber, into which cold water is injected. Residual dust is scrubbed from the gas at the same time.

The volume of the partial stream of exhaust gas which is discharged is so adjusted that the recycle gas is not enriched with nitrogen which has been introduced with the replenishing gas. The replenishing gas usually consists of a gas which has been produced from natural gas and contains H$_2$ and CO. The replenished recycle gas is re-compressed and reheated and is then supplied in part to the first reducing stage and in part to the second reducing stage. The solids may be reheated before they are charged into the fluidized bed reactor of the circulating fluidized bed. That preheating is effected under oxidizing conditions. If the solids consist of or contain a major amount of magnetite (Fe$_3$O$_4$) they must previously be oxidized to hematite (Fe$_2$O$_3$).

The composition of the gas is adjusted in accordance with the known processes mentioned hereinbefore.

The advantages afforded by the invention reside in that a major part of the reduction is effected in a circulating fluidized bed, i.e. in a reactor which is relatively small in diameter and does not contain internal inserts and in which the flow is uniform. Because the mass transfer and heat transfer in the circulating fluidized bed are highly effective, the reaction can be carried out in a small unit within a relatively short residence time.

The remaining reduction and the carburization require a longer residence time and are effected in the conventional fluidized bed, in which only a small residual reaction is effected so that it may be much smaller than a conventional fluidized bed for effecting a complete reaction. Because in accordance with the invention the two fluidized beds are coupled as regards the gas and solid streams, the process is partly carried out in a countercurrent operation so that a higher conversion of the gas and a lower consumption of gas are achieved.

According to a preferred feature 50 to 80% of the recycle gas are supplied as a fluidizing gas to the conventional fluidized bed of the second reducing stage employed in accordance with step (b) and the remaining recycle gas is supplied as a fluidizing gas to the fluidizing bed reactor of the circulating fluidized bed system employed in accordance with step (a). As a result, a large amount of fresh reducing gas is supplied to the second reducing stage and the surplus which is contained in the exhaust gas from the second reducing stage may be optimally utilized in the first reducing stage.

According to a preferred feature the pressures in the first reducing stage employed in accordance with step (a) and in the second reducing stage employed in accordance with step (b) are so adjusted that the pressure in the upper part of the fluidized bed reactor of the circulating fluidized bed system employed in accordance with step (a) is 3 to 6 bars.

In that case the entire system for the first and second reducing stages will be under an appropriate pressure and the pressure of the gas before it enters each fluidized bed will be correspondingly higher. Particularly good results will be obtained with pressures in that range, although a higher pressure may be employed, in principle.

According to a preferred feature the conventional fluidized bed employed in accordance with step (b) is provided in a reactor which has a rectangular cross-section having a length-to-width ratio of at least 2:1 and containing transverse overflow weirs for the solids. The overflow weirs are parallel to the narrow sides of the reactor and extend from the gas-permeable bottom to slightly below the top surface of the fluidized bed. Solids flow from the input side over the weirs to the discharge side. Owing to the slender and long shape of the reactor and the provision of the overflow weirs a back-mixing of more highly reduced solids with less reduced solids will substantially be avoided so that a very effective final reduction and carburization will be achieved.

According to a further feature the iron oxide containing materials are pre-reduced in one or more suspension heat exchangers by the exhaust gas from the circulating fluidized bed system before they are supplied to the fluidized bed reactor of the circulating fluidized bed system employed in accordance with step (a). The exhaust gas used for the pre-reduction is taken behind the recycle cyclone before the gas is cooled below the dewpoint temperature in accordance with step (c). That preliminary reduction effected before the pre-reduction proper in accordance with step (a) will result in an even better utilization of the reducing gas and, as a result, in a higher throughput rate.

In accordance with another aspect of the invention the object is also accomplished in that a) in a first reducing stage the iron oxide-containing materials are charged into the fluidized bed reactor of a circulating fluidized bed system, hot reducing gas is supplied as a fluidizing gas to the fluidized bed reactor, the iron oxides are pre-reduced, the suspension discharged from the fluidized bed reactor is treated in the recycle cyclone of the circulating fluidized bed system to remove substantially all solids and the separated solids are recycled to the fluidized bed reactor in such a manner that the amount of solids which are circulated per hour in the circulating fluidized bed system is at least five times the weight of solids contained in the fluidized bed reactor, b) solids from the first reducing stage are supplied in a second reducing stage to a conventional fluidized bed, hot reducing gas is supplied as a fluidizing gas to the conventional fluidized bed, the solids are reacted to remove the remaining oxygen content and to convert less than 50% of the iron content to $Fe_3C$, the exhaust gas from the conventional fluidized bed is supplied as a secondary gas to the fluidized bed reactor employed in accordance with step (a) and the product which contains $Fe_3C$ is withdrawn from the conventional fluidized bed, c) the exhaust gas from the recycle cyclone used in accordance with step (a) is cooled below its dewpoint temperature and water is condensed from the exhaust gas, d) a partial stream of the exhaust gas is drawn off, e) the remaining partial stream is replenished by an addition of reducing gas and is reheated and is then used as a recycle gas, a part of which is supplied as a fluidizing gas to the fluidized bed reactor of the first reducing stage employed in accordance with step (a) and another part of which is supplied to the fluidized bed of the second reducing stage employed in accordance with step (b).

The advantage afforded by the process in accordance with this aspect of the invention is that the $H_2$ component of the recycle gas will be sufficient for the reduction. Whereas the residence time in the second reducing stage is usually about nine hours, it can be decreased to about five hours in this process. Owing to the lower rate of the recycle gas, up to 50% of the energy used for compressing is saved. The product obtained after the second reducing stage may be transported and charged in briquetted form like scrap. Owing to the lower carbon content of the resulting product it may constitute a larger part, amounting to up to 100%, of a total charge to be processed in an electric arc furnace.

According to a preferred further feature of the invention 50 to 80% of the recycle gas is supplied as a fluidizing gas to the conventional fluidized bed of the second reducing stage employed in accordance with step (b) and the remaining recycle gas is supplied as a fluidizing gas to the fluidizing bed reactor of the circulating fluidized bed system employed in accordance with step (a) and an $H_2$ content of 85 to 95% by volume is adjusted in the fluidizing gases.

As a result, a large amount of fresh reducing gas is supplied to the second reducing stage and the surplus which is contained in the exhaust gas from the second reducing stage may be optimally utilized in the first reducing stage.

The product obtained after the second reducing stage contains 0 to 0.1% by weight carbon. That feature of the invention affords the advantage that still higher $H_2$ contents and, as a result, even still lower recycle gas rates, are used. It also means a further decrease of the dimensions of the reactors and in a further saving of electrical energy for compressing the recycle gas.

According to a preferred further feature of the invention 50 to 80% of the recycle gas is supplied as a fluidizing gas to the conventional fluidized bed of the second reducing stage employed in accordance with step (b) and the remaining recycle gas is supplied as a fluidizing gas to the fluidizing bed reactor of the circulating fluidized bed system employed in accordance with step (a) and an $H_2$ content of 50 to 85% by volume is adjusted in the fluidizing gases. As a result of this feature of the invention a highly reduced product which contains less than 50% $Fe_3C$ is economically obtained within a short time and that product can conveniently be briquetted and can easily be transported.

According to a preferred feature of the invention an $H_2$ content of 50 to 75% by volume is adjusted in the fluidizing gases. These preferred measures result in a product which can be made particularly economically and can be briquetted particularly conveniently.

A preferred further feature of the invention resides in that the pressures in the first reducing stage employed in accordance with step (a) and in the second reducing stage employed in accordance with step (b) are so adjusted that the pressure in the upper part of the fluidized bed reactor of the circulating fluidized bed system employed in accordance with a) is 1.5 to 6 bars. In this case the entire system for the first and second reducing stages will be under an appropriate pressure and the pressure of the gas before it enters each fluidized bed will be correspondingly higher. Particularly good results will be obtained with pressures in that range although in principle a higher pressure may be employed.

A preferred further feature of the invention resides in that the conventional fluidized bed employed in accordance with step (b) is provided in a reactor which has a rectangular cross-section having a length-to-width ratio of at least 2:1 and containing transverse overflow weirs for the solids. The overflow weirs are parallel to the narrow sides of the reactor and extend from the gas-permeable bottom to slightly below the top surface of the fluidized bed. Solids flow from the input side over the weirs to the discharge side. Owing to the slender and long shape of the reactor and the provision of the overflow weirs a back-mixing of more highly reduced solids with less reduced solids will substantially be avoided so that a very effective final reduction and carburization will be achieved.

According to a further feature of the invention the iron oxide containing materials are preheated in one or more suspension heat exchangers and/or are pre-reduced by the exhaust gas from the circulating fluidized bed system before they are supplied to the fluidized bed reactor of the circulating fluidized bed system employed in accordance with step (a). The exhaust gas used for the pre-reduction is taken behind the recycle cyclone before the gas is cooled below the dewpoint temperature in accordance with step (c). That preliminary reduction effected before the pre-reduction proper in accordance with a) will result in an even better utilization of the reducing gas and, as a result, in a higher throughput rate.

A preferred further feature of the invention resides in that the product obtained in process stage (b) is briquetted, preferably in a hot state.

BRIEF DESCRIPTION OF THE DRAWING

The above and other objects, features, and advantages will become more readily apparent from the following description, reference being made to the accompanying drawing, in which FIG. 1 is a flow diagram of a plant for carrying out the method of the invention.

SPECIFIC DESCRIPTION

FIG. 1

Fine-grained ore is charged through line 1 to a venturi preheater 2. The suspension is supplied in line 3 to a cyclone 4, in which gas and solids are separated. The separated solids are supplied through line 5 to the venturi preheater 6. The combustion chamber 9 is supplied with fuel in line 7 and with combustion air in line 8. The hot combustion gases are conducted in line 10 to the venturi preheater 6. The suspension is supplied in line 11 to a cyclone 12, in which solids and gas are separated. The gas from the cyclone 12 is conducted in line 13 to the venturi preheater 2. The gas from the cyclone 4 is conducted in line 14 to a filter 15, from which the purified gas is discharged through line 16 and the separated dust is discharged through line 17.

The solids which have been separated in the cyclone 12 are supplied in line 17 to the bin 18 and are withdrawn from the latter through line 19 to the screw conveyor 20 and supplied from the latter in line 21 to the fluidized bed reactor 22 of the circulating fluidized bed system.

The gas-solids suspension is supplied from the fluidized bed reactor 22 in line 23 to the recycle cyclone 24. The separated solids are recycled in line 25 to the fluidized bed reactor 22.

The gas from the recycle cyclone 24 is conducted in line 26 to the heat exchanger 27. The cooled gas is conducted in line 28 to the scrubber 29 and is cooled therein below the dewpoint temperature of the water vapor so that substantially all water vapor is removed. The purified gas is conducted in line 30 to the heat exchanger 27.

Reducing gas for replenishment is admixed from line 31.

The preheated reducing gas is conducted in line 32 to the reheater 33 and is reheated there to the temperature which is required for the process. The reheated gas leaves the reheater 33 in line 34 and a part of that gas is supplied in lines 35 as a fluidizing gas to a conventional fluidized bed reactor 36 and another part is supplied in line 37 as a fluidizing gas to the fluidized bed reactor 22 of the circulating fluidized bed system.

From the fluidized bed reactor 22 of the circulating fluidized bed system, solids are supplied in line 38 to the fluidized bed reactor 36 of the conventional fluidized bed.

The dustladen exhaust gas from the fluidized bed reactor 36 of the conventional fluidized bed is conducted in line 39 to the cyclone 40. The separated dust is recycled in line 41 to the fluidized bed reactor 36 and the gas is supplied in line 42 as a secondary gas to the fludized bed reactor 22 of the circulating fluidized bed system.

The $Fe_3C$-containing product from the fluidized bed reactor 36 containing the conventional fluidized bed is supplied in line 43 to the cooler 44 and is cooled therein and then discharged through line 45. Cooling water is conducted in line 46 to the cooler 44 and is discharged through line 47. Water is supplied in line 48 to the scrubber 29 and is discharged through line 49. Fuel and combustion air are supplied in lines 50 to the reheater 33. The combustion gases are discharged through line 51. A partial stream is removed through line 52 from the recycle gas in order to prevent an enriching of nitrogen in the recycle gas.

SPECIFIC EXAMPLES

At a rate of 61,200 kg/h, a moist ore having a moisture content of 7.8% was supplied to the venturi preheater 2. Natural gas at a rate of 1,500 $sm^3$/h ($sm^s$=STP=standard temperature and pressure=standard cubic meter) was supplied through line 7 and air at a rate of 21,000 $sm^3$/h was supplied through line 8 to the combustion chamber 9. Dust at a rate of 2600 kg/h was separated in the filter 15 and discharged through line 17. Preheated ore at 500° C. was supplied through line 21 at a rate of 54,200 kg/h to the fluidized bed reactor 22 of the circulating fluidized bed system (CFBS). The pressure at the outlet of the fluidized bed reactor 22 was 4 bars. The reduction temperature was 630° C. The fluidized bed reactor 22 had a diameter of 3 meters.

A pre-reduced material having a metallization of 70% was supplied from the fluidized bed reactor 22 through line 38 to the fluidized bed reactor 36 at a rate of 40,600 kg/h. The fluidized bed reactor 36 had a length of 12 meters and a width of 4 meters.

A product having a metallization of 92% was delivered from the fluidized bed reactor 36 through line 43 at a rate of 36,800 kg/h to the briquetting plant 44 and was briquetted there. The product contained 0.5% by weight carbon. Exhaust gas containing 79% $H_2$, 12% $H_2O$, and 9% $N_2$ was supplied through line 26 at a rate of 182,000 $sm^3$/h through line 26 to the heat exchanger 27 and was cooled therein to 120° C. The cooled gas was cooled to 28° C. in the scrubber 29. After a make-up gas which contained 97% $H_2$ had been admixed from line 31 at a rate of 23,000 $sm^3$/h, the gas composed of 91% $H_2$, 0.6 % $H_2O$, and 8.4% $H_2$ was supplied to the heat exchanger 27 and reheated to 520° C. After a further reheating in the reheater 33, 70% of the gases were supplied as fluidizing gas to the reactor 36 of the conventional fluidized bed system. The remaining 30% of the gases were supplied through line 37 as a fluidizing gas to the reactor 22 of the circulating fluidized bed system.

EXAMPLE 2

At a rate of 61,200 kg/h, a moist ore having a moisture content of 7.8% was supplied to the venturi preheater 2. Natural gas at a rate of 1,500 $sm^3$/h ($sm^3$=standard cubic meter) was supplied through line 7 and air at a rate of 21,000 sm³/h ws supplied through line 8 to the combustion chamber 9. Dust at a rate of 2600 kg/h ws separated in the filter 15 and discharged through line 17. Preheated ore at 500° C. was supplied through line 21 at a rate of 54,200 kg/h to the fluidized bed reactor 22 of the CFBS. The pressure at the outlet of the fluidized bed reactor 22 ws 4 bars. The reduction temperature was 630° C. The fluidized bed reactor 22 had a diameter of 4 meters.

A pre-reduced material having a metallization of 70% was supplied from the fluidized bed reactor 22 through line 38 to the fluidized bed reactor 36 at a rate of 40,600 kg/h. The fluidized bed reactor 36 had a length of 12 meters and a width of 4 meters.

A product containing 63% metallic iron, 30% $Fe_3C$, 6% $Fe_3O_4$, balance gangue, was supplied at a rate of 37,600 kg/h from the fluidized bed reactor 36 through line to the briquetting plant 44 and was briquetted there. The product contained 2.0% by weight carbon. Exhaust gas which contained 50% $H_2$, 8% $H_2O$, 9% $N_2$, 31% $CH_4$, and 2% $CO=CO_2$ was supplied at a rate of 311,000 sm³/h through line 26 to the heat exchanger 27 and was cooled therein to 120° C. The cooled gas was cooled in the scrubber 29 to 28° C. After a make-up gas containing 90% $H_2$ 3% $CH_4$, 4% CO, and 3% $H_2O$ had been admixed from line 31 at a rate of 24,000 sm³/h, the gas composed of 57% $H_2$, 0.6% $H_2O$, 9% $N_2$, 31% $CH_4$, and 2.4% $CO+CO_2$ was supplied to the heat exchanger 27 and reheated to 520° C. After a further reheating in the reheater 33, 70% of the gases were supplied as fluidizing gas to the reactor 36 of the conventional fluidized bed system. The remaining 30% of the gases were supplied through line 37 as a fluidizing gas to the reactor 22 of the circulating fluidized bed system.

We claim

1. A process for a direct reduction of iron oxide containing materials to produce sponge iron and for a carburization to form $Fe_3C$ in a fluidized bed supplied with a circulating reducing gas, said process comprising the steps of:

(a) in a first reducing stage charging the iron oxide containing materials into a fluidized bed reactor of a circulating fluidized bed system, supplying hot reducing gas as a fluidizing gas to the fluidized bed reactor, pre-reducing the iron oxides to form reduced iron-containing solids, treating a suspension discharged from the fluidized bed reactor in a recycle cyclone of the circulating fluidized bed system to remove substantially all reduced iron-containing solids, and recycling separated reduced iron-containing solids to the fluidized bed reactor in such a manner that the amount of reduced iron-containing solids which are circulated per hour in the circulating fluidized bed system is at least five times the weight of reduced iron-containing solids contained in the fluidized bed reactor;

(b) supplying reduced iron-containing solids from the first reducing stage in a second reducing stage to a conventional fluidized bed reactor that is not part of a circulating fluidized bed system, supplying hot reducing gas as a fluidizing gas to the conventional fluidized bed reactor, reacting the reduced iron-containing solids to remove remaining oxygen content and to convert the iron content thereof substantially completely to $Fe_3C$, supplying an exhaust gas from the conventional fluidized bed reactor as a secondary gas to the fluidized bed reactor of step (a), and withdrawing a product which contains $Fe_3C$ from the conventional fluidized bed reactor;

(c) cooling the exhaust gas from the recycle cyclone used in step (a) below its dewpoint temperature and condensing water from the exhaust gas;

(d) drawing off a partial stream of the exhaust gas; and (e) replenishing the remaining partial stream by addition of reducing gas thereto and reheating the replenished partial stream and using same as a recycle gas, a part of which is supplied as a fluidizing gas to the circulating fluidized bed reactor of the first reducing stage employed in step (a) and another part of which is supplied to the conventional fluidized bed reactor that is not part of a circulating fluidized bed system of the second reducing stage employed in step (b).

2. The process defined in claim 1 wherein 50 to 80% of the recycle gas is supplied as a fluidizing gas to the conventional fluidized bed of the second reducing stage employed in step (b) and the remaining recycle gas is supplied as a fluidizing gas to the fluidizing bed reactor for the circulating fluidized bed system employed in step (a).

3. The process defined in claim 1 wherein the pressures in the first reducing stage employed in step (a) and in the second reducing stage employed in step (b) are so adjusted that the pressure in the upper part of the fluidized bed reactor of the circulating fluidized bed system employed in step (a) is 3 to 6 bars.

4. The process defined in claim 1 wherein the conventional fluidized bed employed in step (b) is provided with a reactor which has a rectangular cross-section having a length-to-width ratio of at least 2:1 and containing transverse overflow weirs for the solids.

5. The process defined in claim 1 wherein the iron oxide-containing materials are pre-reduced in one or more suspension heat exchangers by the exhaust gas from the circulating fluidized bed system before they are supplied to the fluidized bed reactor of the circulating fluidized bed system employed in step (a).

6. A process for a direct reduction of iron oxide containing materials in fluidized beds with a circulating of reducing gas, wherein (a) in a first reducing stage charging the iron oxide containing materials into a fluidized bed reactor of a circulating fluidized bed system, supplying hot reducing gas as a fluidizing gas to the fluidized bed reactor, pre-reducing the iron oxides to form reduced iron-containing solids, treating a suspension discharged from the fluidized bed reactor in a recycle cyclone of the circulating fluidized bed system to remove substantially all reduced iron-containing solids, and recycling separated reduced iron-containing solids to the fluidized bed reactor in such a manner that the amount of solids which are circulated per hour in the circulating fluidized bed system is at least five times the weight of reduced iron-containing solids contained in the fluidized bed reactor;

(b) supplying reduced iron-containing solids from the first reducing stage in a second reducing stage to a conventional fluidized bed reactor that is not part of a circulating fluidized bed system, supplying hot reducing gas as a fluidizing gas to the conventional fluidized bed, reacting the reduced iron-containing solids to remove remaining oxygen content and to convert less than 50% of the iron content to $Fe_3C$, supplying an exhaust gas from the conventional fluidized bed reactor as a secondary gas to the fluidized bed reactor of step (a), and withdrawing a product which contains $Fe_3C$ from the conventional fluidized bed reactor;

(c) cooling the exhaust gas from the recycle cyclone used in step (a) below its dewpoint temperature and condensing water from the exhaust gas;

(d) drawing off a partial stream of the exhaust gas; and (e) replenishing the remaining partial stream by addition of reducing gas thereto and reheating the replenished partial stream and using same as a recycle gas, a part of which is supplied as a fluidizing gas to the circulating fluidized bed reactor of the first reducing stage employed in step (a) and another part of which is supplied to the conventional fluidized bed reactor that is not part of a circulating fluidized bed system of the second reducing stage employed in step (b).

7. The process defined in claim 6 wherein 50 to 80% of the recycle gas are supplied as a fluidizing gas to the conventional fluidized bed of the second reducing stage employed in step (b) and the remaining recycle gas is supplied as a fluidizing gas to the fluidizing bed reactor of the circulating fluidized bed system employed in step (a) and an $H_2$ content of 85 to 95% by volume is adjusted in the fluidizing gases.

8. The process defined in claim 6 wherein 50 to 80% of the recycle gas are supplied as a fluidizing gas to the conventional fluidized bed of the second reducing stage employed in step (b) and the remaining recycle gas is supplied as a fluidizing gas to the fluidizing bed reactor of the circulating fluidized bed system employed in step (a) and an $H_2$ content of 50 to 85% by volume is adjusted in the fluidizing gases.

9. The process defined in claim 6 wherein an $H_2$ content of 50 to 75% by volume is adjusted in the fluidizing gases.

10. The process defined in claim 6 wherein the pressures in the first reducing stage employed in step (a) and in the second reducing stage employed in step (b) are so adjusted that the pressure in the upper part of the fluidized bed reactor of the circulating fluidized bed reactor system employed in step (a) is 1.5 to 6 bars.

11. The process defined in claim 6 wherein the conventional fluidized bed employed in step (b) is provided in a reactor which has a rectangular cross-section having a length-to-width ratio of at least 2:1 and containing transverse overflow weirs for the solids.

12. The process defined in claim 6 wherein the iron oxide-containing materials are preheated in one or more suspension heat exchangers or are pre-reduce by the exhaust gas from the circulating fluidized bed system before they are supplied to the fluidized bed reactor of the circulating fluidized bed system employed in step (a).

13. The process defined in claim 6 wherein the product obtained in step (b) is briquetted.

14. The process defined in claim 13 wherein the product obtained in step (b) is briquetted in a hot state.

\* \* \* \* \*